United States Patent
Kadirkamanathan et al.

(10) Patent No.: US 9,002,490 B2
(45) Date of Patent: Apr. 7, 2015

(54) METHODS AND SYSTEMS FOR GENERATING FRICTIONLESS SOCIAL EXPERIENCE ENVIRONMENT

(75) Inventors: Mahapathy Kadirkamanathan, Cambridge (GB); Simon Hayhurst, Palo Alto, CA (US)

(73) Assignee: Longsand Limted (GB)

( * ) Notice: Subject to any disclaimer, the term of this patent is extended or adjusted under 35 U.S.C. 154(b) by 734 days.

(21) Appl. No.: 13/086,360

(22) Filed: Apr. 13, 2011

(65) Prior Publication Data
US 2012/0265328 A1     Oct. 18, 2012

(51) Int. Cl.
G06F 17/00     (2006.01)
H04L 29/06     (2006.01)

(52) U.S. Cl.
CPC ........ H04L 65/4015 (2013.01); H04L 65/1069 (2013.01)

(58) Field of Classification Search
USPC .................... 700/94; 369/1–12; 704/500–504
See application file for complete search history.

(56) References Cited

U.S. PATENT DOCUMENTS

| | | | |
|---|---|---|---|
| 7,512,900 B2 | 3/2009 | Lynch et al. | |
| 8,229,743 B2 | 7/2012 | Carter et al. | |
| 8,554,681 B1 * | 10/2013 | Wieder | 705/51 |
| 2003/0086341 A1 * | 5/2003 | Wells et al. | 369/13.56 |
| 2005/0024387 A1 | 2/2005 | Ratnakar et al. | |
| 2005/0091275 A1 * | 4/2005 | Burges et al. | 707/104.1 |
| 2007/0055500 A1 * | 3/2007 | Bilobrov | 704/217 |
| 2008/0194323 A1 | 8/2008 | Merkli et al. | |
| 2009/0193124 A1 * | 7/2009 | Larsson et al. | 709/227 |
| 2010/0257052 A1 | 10/2010 | Zito et al. | |
| 2010/0281156 A1 | 11/2010 | Kies et al. | |
| 2011/0063317 A1 | 3/2011 | Gharaat et al. | |
| 2011/0289098 A1 | 11/2011 | Oztaskent et al. | |
| 2012/0221645 A1 * | 8/2012 | Anthru et al. | 709/204 |
| 2012/0222061 A1 * | 8/2012 | Anthru et al. | 725/28 |

FOREIGN PATENT DOCUMENTS

WO     WO 2010/141260 A1     12/2010

OTHER PUBLICATIONS

International Search Report and Written Opinion for International Patent Application No. PCT/US12/33390 dated Jun. 28, 2012, 9 pages.

Business Wire News, "Auditude Announces Launch of Crosspoint Media Online Video Network Focused on Television Content", http://www.businesswire.com/news/home/20101027005366/en/Auditude-Announces-Launch-Crosspoint-Media-Online-Video, Oct. 27, 2010, 2 pages.

McCarty, Brad, "IntoNow: A TV Check-in Service That Hears What You're Watching", Thenextweb.com Article, http://thenextweb.com/apps/2011/01/31/intonow-a-tv-check-in-service-that-hears-what-youre-watching/, Jan. 31, 2011, 3 pages.

* cited by examiner

Primary Examiner — Andrew C Flanders
(74) Attorney, Agent, or Firm — Rutan & Tucker, LLP

(57) ABSTRACT

Methods for implementing shared experiences using mobile computing devices comprise capturing audio waves associated with a media using a built-in microphone of a mobile computing device, the mobile computing device including a processor, a memory, a display screen, a built-in battery to power the mobile computing device, and a built-in communication module to enable wireless communication. A signature is generated from the audio waves captured by the microphone. Based on the signature being recognized as a known signature, the signature and positioning information are transmitted to an audio server using the wireless communication. The positioning information identifies a specific moment in the media that a user of the mobile computing device is listening, the audio server and the mobile computing device connected to a network. Activity information is received from the audio server. The activity information is related to the media and associated with a third party server connected to the network. The user of the mobile computing device is enabled to use the activity information to interact with the third party server.

19 Claims, 11 Drawing Sheets

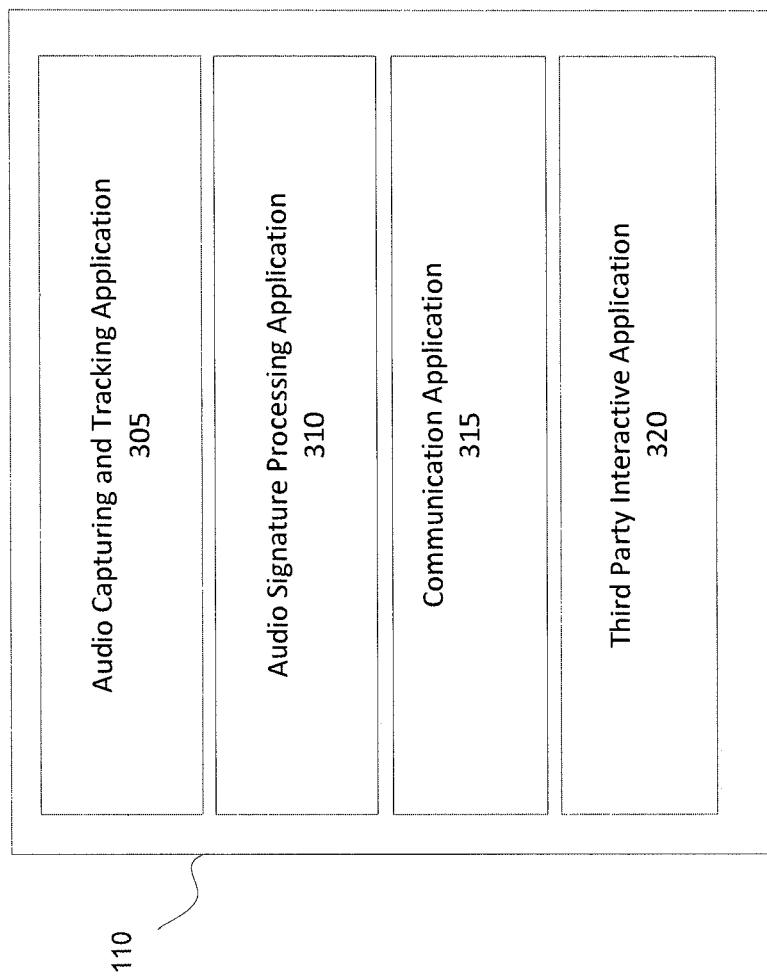

METHODS AND SYSTEMS FOR GENERATING FRICTIONLESS SOCIAL EXPERIENCE ENVIRONMENT

FIELD

Embodiments of the present invention generally relate to the field of data processing, and in some embodiments, specifically relate to using audio fingerprint for frictionless social experience.

BACKGROUND

Techniques that convert audio to text have been useful in many applications. However, they still fail to meet the needs of many users in today's environments, especially in the mobile computing arena.

SUMMARY

A mobile computing system to enable users to have an improved social experience is disclosed. The mobile computing device comprises an audio capturing and tracking module configured to listen to and capture audio waves associated with a media that a user of the mobile computing device is listening to. The media may be an audio or an audio-video including a Television show, a movie, a Radio show, a podcast, and other audio programs. The audio capturing and tracking module may listen and capture the audio waves for a duration sufficiently long enough to enable an audio signature processing module to analyze the audio waves and generate a signature for the media. The audio signature processing module is further configured to compare the signature with a set of known signatures. Each of the signatures in the set of known signatures is associated with a known media. When there is a match between the signature and a known signature, the signature is transmitted to an audio server using wireless communication. The mobile computing device and the audio server are coupled to the Internet. The audio server is configured to identify the media using the signature. The audio server is also configured to identify a point in time or specific moment and duration in the media that synchronizes with what the user is currently listening to. The media may include media options that solicit interactions from the user. The media options may be received from the audio server using the wireless communication. The media options may be presented to the user on a display screen of the mobile computing device. The user may interact with the media by selecting the media options.

BRIEF DESCRIPTION OF THE DRAWINGS

The multiple drawings refer to the embodiments of the invention. While embodiments of the invention described herein is subject to various modifications and alternative forms, specific embodiments thereof have been shown by way of example in the drawings and will herein be described in detail.

FIG. 3A is a block diagram that illustrates an example of applications that may be included in a mobile computing device, in accordance with some embodiments of the invention.

DETAILED DESCRIPTION

Figure 1:
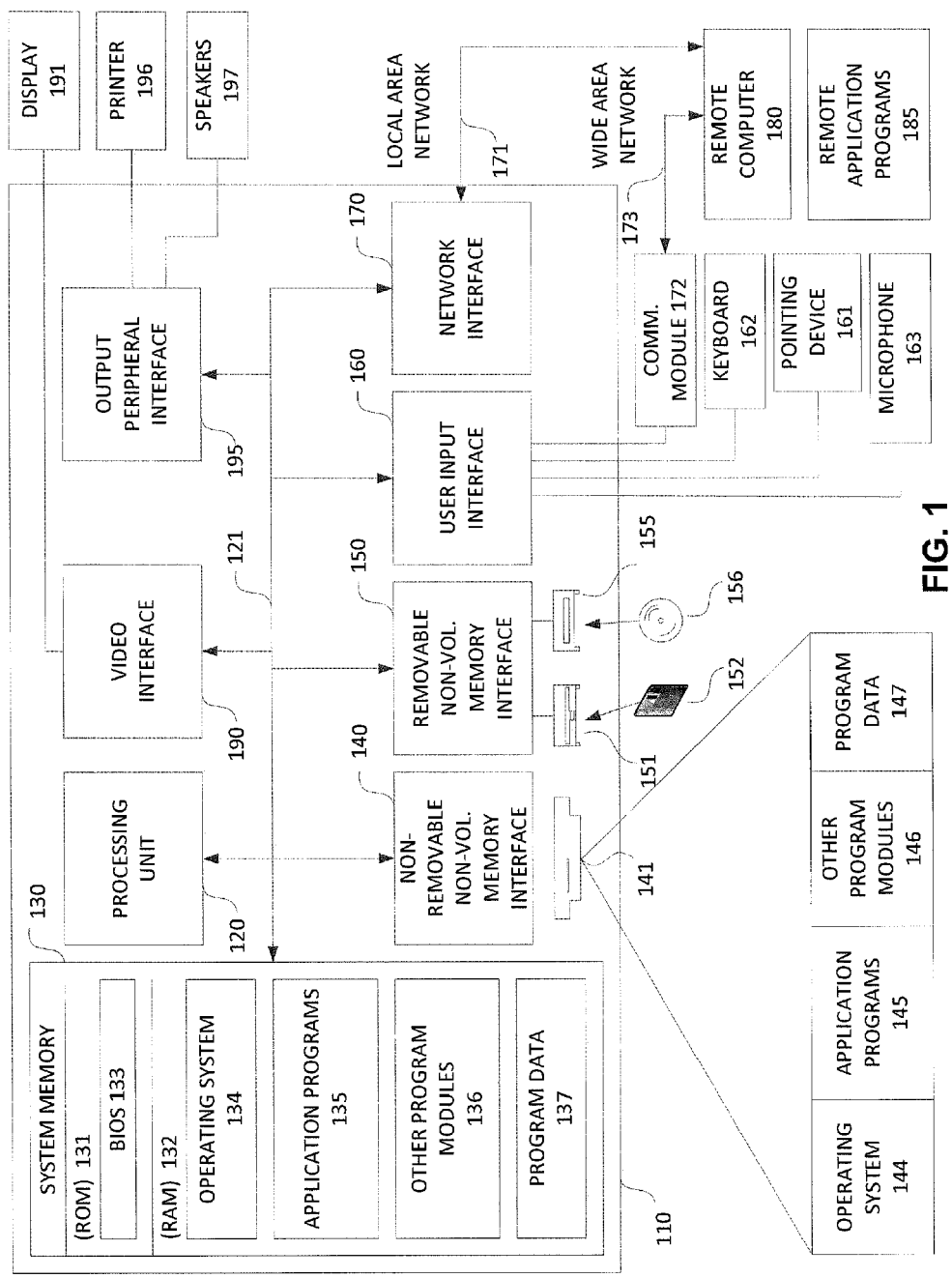
FIG. 1 illustrates a block diagram of an example computing system that may use an embodiment of one or more of the software applications discussed herein.

For some embodiments, a method for enabling a user of a mobile computing devices\ to have a frictionless social experience is disclosed. The method comprises capturing audio waves associated with a media using a mobile computing device. The mobile computing device includes a processor, a memory, a built-in battery to power the mobile computing device, a built-in microphone configured to capture the audio waves, and a built-in communication module to enable wireless communication. The method comprises generating a signature based on the audio waves when it is determined that a sufficient duration of the audio waves has been captured, and transmitting the signature to an audio server using the wireless communication when it is determined that the signature is similar to one of many known signatures. Timing information is also transmitted to the audio server to enable the audio server to synchronize with the mobile computing device as related to the audio waves being captured by the mobile computing device. The mobile computing device and the audio server are connected to the Internet. The method also comprises receiving options available with the media from the audio server based on the audio server identifying the media associated with the signature received from the mobile computing device, and based on the audio server communicating with a third party server associated with the media, wherein the user of the mobile computing device is able to use the options to interact with the media. In addition, based on the audio server communicating with a third party social network server, the user of the mobile computing device is further able to use social network tools or commands available from the third party social network server to share information about the media.

In the following description, numerous specific details are set forth, such as examples of specific data signals, components, connections, etc. in order to provide a thorough understanding of the present invention. It will be apparent, however, to one skilled in the art that the present invention may be practiced without these specific details. In other instances, well known components or methods have not been described in detail but rather in block diagrams in order to avoid unnecessarily obscuring the present invention. Thus, the specific details set forth are merely exemplary. The specific details may be varied from and still be contemplated to be within the spirit and scope of the present invention.

In the following description of exemplary embodiments, reference is made to the accompanying drawings that form a part hereof, and in which it is shown by way of illustration specific embodiments in which the invention can be practiced. It is to be understood that other embodiments can be used and structural changes can be made without departing from the scope of the embodiments of this invention. As used herein, the terms "couple," "connect," and "attach" are interchangeable and include various forms of connecting one part to another either directly or indirectly. Also, it should be appreciated that one or more structural features described in one embodiment could be implemented in a different embodiment, even if not specifically mentioned as being a feature thereof.

Figure 2:
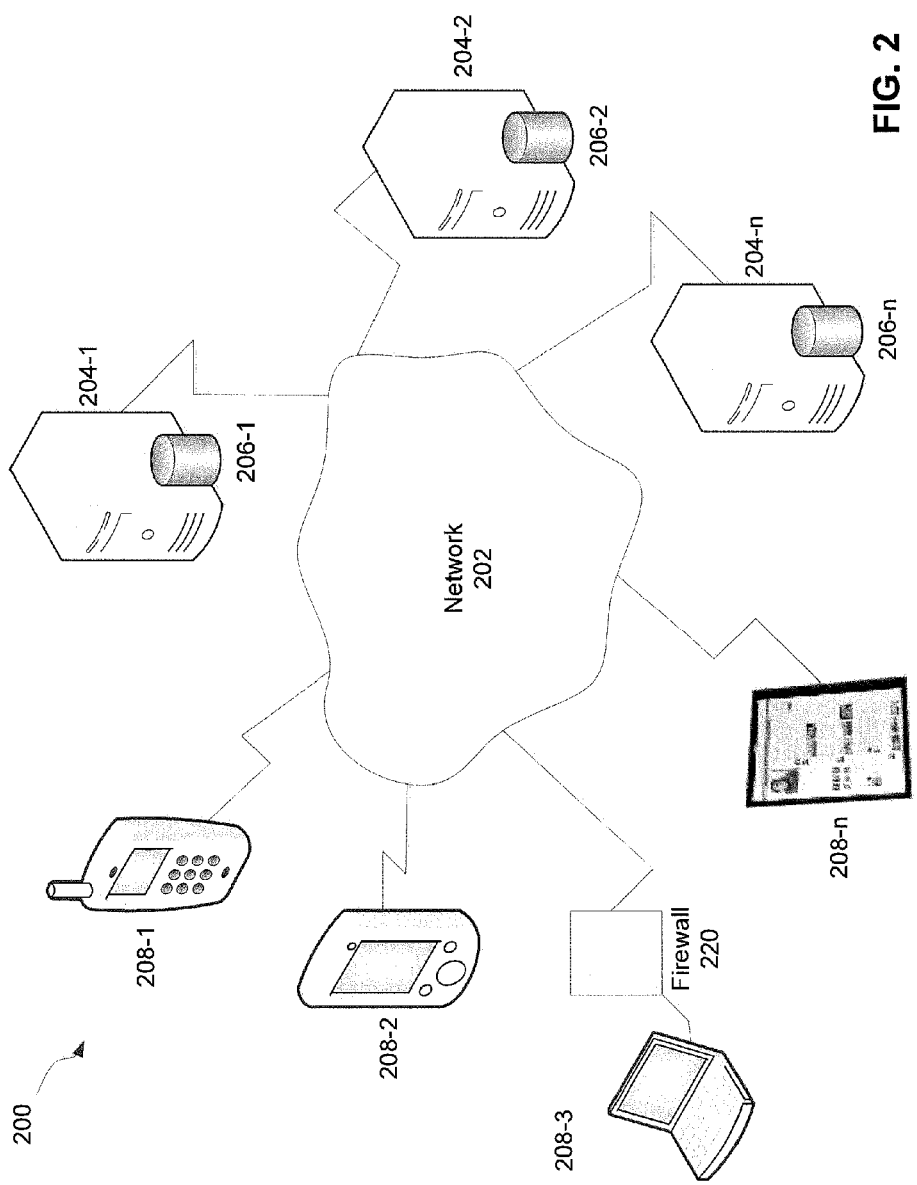
FIG. 2 illustrates an example of a network that may be used with embodiments of the invention.

FIG. 1 and FIG. 2 illustrate example environments to implement the frictionless social experience concepts herein.

Overview

In general, the frictionless social experience as described herein relates to an experience that a user can enjoy with a mobile computing device and while requiring minimal actions from the user. The techniques described herein may enable the users to share information about specific moments in a specific audio or audio video program. Content, time and context-relevant actions may be automated based on recognizing the specific moments in the audio or audio video program including, for example, automated insertion of content-relevant advertisements.

For some embodiments, the experience may be related to audio waves associated with an audio program or an audio video program. The audio program and the audio video program are referred to generally as a media. The media may be current or recorded. The audio waves may be analyzed to identify the media. When the media include options that solicit interactions from the user, the user may use the mobile computing device to interact with the media. In addition, the user may also use the mobile computing device and various social network tools to post the user's experience with the media and/or to share the user's experience with friends. As will be described, some embodiments of the present invention include an audio server connected to the Internet and configured to identify the media associated with the audio waves captured by the mobile computing device.

In an embodiment, one or more applications may be resident on the mobile client device or on a server. The resident application has a couple of routines built in:

A first routine may capture an audio fingerprint of a multi-media show—TV show, and possibly Radio show, Podcast, etc. consisting of a representation of the audio wavelengths recorded through the speakers of the mobile device and stored in its memory. When activated by the user, the resident application will record/captures a set of amount of audio information. The duration of the set amount of recorded audio information may be number of possibilities including 1) a fixed period of time prior to the activation and after the activation, 2) a period of time between the last detectable scene change and the next scene change, 3) a fixed period time prior to the user's first activation, such as a click, and a fixed period time after a user's second activation, 4) and other fixed periods. The application then plays back the captured audio, and potentially both the visual and audio, portion of the multimedia clip to the user to allow the user to refine the boundaries of the section of interest of the show to be used as the audio frequencies for the audio fingerprint.

The section of interest of the show, defined by the captured audio frequencies refined by the user, are then next processed for the creation of the audio fingerprint. This routine either leaves the captured audio frequencies just as they are or more likely transforms these audio frequencies into a mathematical representation of the captured audio frequencies.

The next routine sends the created audio fingerprint to the main server to compare the audio fingerprint with any other segments of audio stored in a set of databases of multi-media shows—TV shows, and possibly Radio shows, Podcasts, etc. and if a match exist then attempts to make a contact with a third party server associated with the broadcasting that audio fingerprint to see if the server has any user activities to be broadcast down for users of mobile devices, such as allowing users to cast a vote on TV show such as IDOL, Xfactor, Dancing with the Stars, Survivor.

The next routine looks at some preferences and other points of information set up by the user of the mobile device. If no user activities exist but match has still been found, the main server will cooperate with the application resident on the mobile device for that user to 1) press a like/dislike button and post that on their designated social media site along with 1) a link to the multimedia/TV clip captured in the audio finger print or 2) the section of interest of the show itself on the social media site; make a comment regarding the section of interest of the show on that user's designated social media site along with 1) a link to the multimedia/TV clip captured in the audio finger print or 2) the section of interest of the show itself on the social media site; email the comment and link to another user, and other possible user activities. The backend Autonomy will also try to assist by seeing who are listed as friends of this person and can post that comment or vote to all or just some of the users' listed friends.

Audio Signature

FIG. 3A is a block diagram that illustrates an example of applications that may be included in a mobile computing device, in accordance with some embodiments of the invention. The mobile computing device 110 illustrated in FIG. 1 may be configured with various applications. Some of these applications may include audio capturing and tracking application 305, audio signature processing application 310, communication application 315, and third party interactive application 320.

The audio capturing and tracking application 305 may be configured to capture audio waves continuously via a microphone of the mobile computing device 110 stored in its memory. The microphone may be associated with a video camera of the mobile computing device 110. The audio waves may be associated with an environmental audio or a media. The media may be a television program that includes an audio portion and a video portion. The media may be a radio program, podcast, etc. that only includes an audio portion. A buffer may be used to keep some portions of the most recently captured audio waves. In this arrangement, the mobile computing device 110 is considered to be in a standard mode.

For some embodiments, the captured audio waves may be kept for analysis upon the user of the mobile computing device 110 activating an analysis mechanism. When activated, the audio capturing and tracking application 305 may capture a set amount of the audio portion. If the audio portion is associated with a video portion, the audio portion may be captured while the video portion is being captured. The duration of the set amount of the captured audio waves may be determined by different factors. For example, the duration may be based on a fixed period of time (e.g., five seconds) from activation, a fixed period of time prior to the activation and a fixed period of time after the activation, a period of time between the user's start option and stop option, scene changes, etc.

For some embodiments, the audio capturing and tracking application 305 may play back the captured audio waves (and potentially the associated video portion) to the user to allow the user to refine the duration or boundaries of the recorded audio portion. Alternatively, the audio capturing and tracking application 305 may keep the captured audio waves as is without the playing back to the user.

The audio signature processing application 310 is configured to process the captured audio waves and generate an audio fingerprint or signature. The signature may be represented in the form of a mathematical formula. The audio signature processing application 310 may then compare the signature with a set of known signatures stored in a memory of the mobile computing device 110 to determine if there is a match. During the process of capturing the audio portion, analyzing the captured audio waves to generate a signature, and comparing the signature with a set of known signatures, the mobile computing device 110 is considered to be in a detection mode.

The audio capturing and tracking application 305 may also be configured to track the audio portion to keep track of audio position information and to determine whether there is a change to the audio portion. For example, this may occur when the user changes from one television program on one channel to another television program on another channel. This is referred to generally as a media switch. For some embodiments, when there is a media switch, the audio capturing and tracking application 305 may go back to the detection mode. Alternatively, the audio capturing and tracking application 305 may detect the user of the mobile computing device 110 de-activating the analysis mechanism. In this case, the mobile computing device 110 may go back to the standard mode.

When there is a match between the signature and one of the known signatures, the signature and the audio position information may then be transmitted to an audio server by the communication application 315. As will be described, the audio server is coupled with a signature database configured to store a plurality of known signatures. These known signatures are periodically transmitted to the mobile computing device 110 to update the known signatures stored in the memory of the mobile computing device. Each of the known signatures is associated with a known media. For some embodiments, the audio server is configured to use the matching signature to determine the corresponding known media. For some embodiments, the audio server is also coupled with a media database configured to store a plurality of media. The audio server may interact with a third party server and/or a social network server to determine options or user activities that may be available to the user as related to the media. For some embodiments, the third party interactive application 320 may be configured to enable the user to use the options to interact with a third party server and the social network server.

Figure 3B:
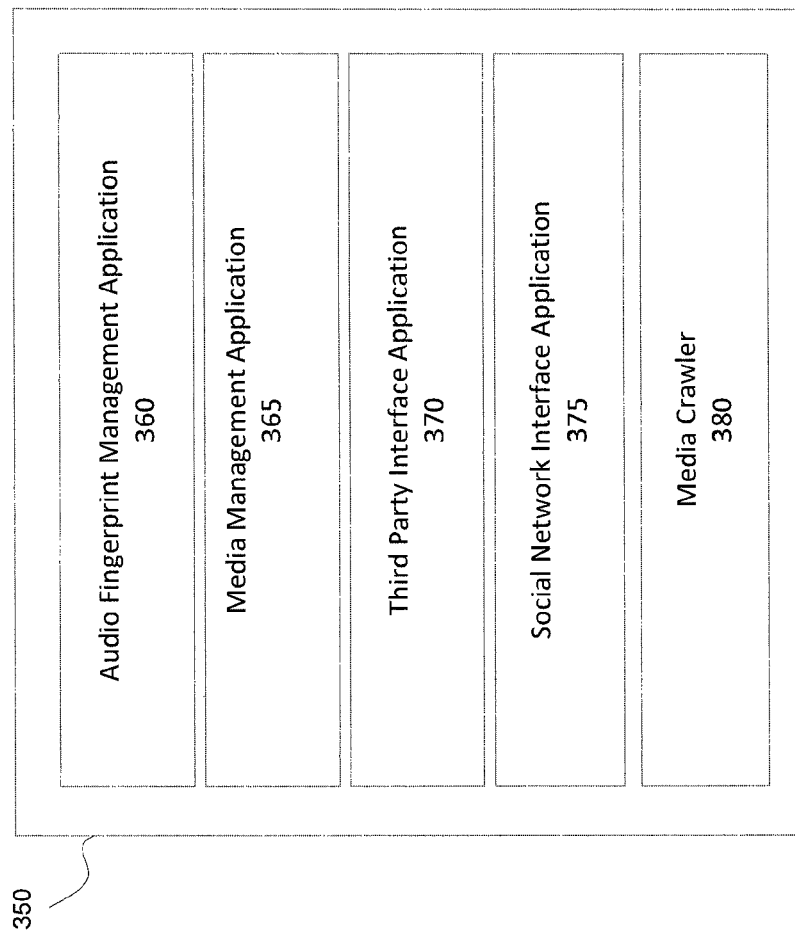
FIG. 3B is a block diagram that illustrates an example of applications that may be included in an audio server, in accordance with some embodiments.

FIG. 3B is a block diagram that illustrates an example of applications that may be included in an audio server, in accordance with some embodiments. Audio server 350 may include an audio fingerprint management application 360, media management application 365, third party interface application 370, social network interface application 375, and media crawler 380.

The audio fingerprint management application 360 may be configured to use the signature received from the mobile computing device 110 to identify a corresponding media. Information about the known signatures and their corresponding media may be stored in the signature database coupled with the audio server 350.

The media management application 365 may be configured to manage the media stored in the media database coupled to the audio server 350. The media database may be configured to store the media including, for example, television shows, radio shows, podcasts, movies, etc. Thus, when the audio sever determines the media from the signature, the audio server may use the media database to locate the media and any third party that is associated with the media.

The third party interface application 370 may then communicate with one or more third party servers 505 (illustrated in FIG. 5A) to determine if the media is associated with any user options. For example, the media may be a television program (e.g., "American Idol", "Dancing with the Stars", "Survivors", etc.) broadcast by the CBS television network, and the television program may solicit input from the viewers in the form of a poll. In this scenario, the third party interface application 370 may communicate with a CBS server to determine the polling options and then transmit the polling options to the mobile computing device 110. The third party interaction application 320 (illustrated in FIG. 3A) may then cause the polling options to be displayed on the display screen of the mobile computing device 110 for the user to select and cast a vote. It should be noted that the third party interface application 370 and the third party interaction application 320 are configured to recognize the media as well as the specific moments in the specific media where the interactions are to occur. For example, at a point that is 15 minutes and 30 seconds into a specific "American Idol" television program, a poll is supposed to be presented to the viewers. At another point that is 28 minutes and 15 seconds into the same "American Idol" television program, a different poll is to be presented to the viewers. The ability of the applications to recognize the specific moment in a specific media may enable the users share the experience with their friends. For example, a user may post a comment such as "I like this dancing movement" in a social network using the mobile computing device 110 about a specific moment in the "Dancing with the Stars" television program, and the post will automatically include information about that specific moment (e.g., link to a clip that includes the specific moment commented by the user, etc.).

The social network interface application 375 is configured to enable the audio server 350 to communicate with one or more social network servers 525 (illustrated in FIG. 5B) that the user of the mobile computing device 110 is associated with. User profile with the social network site may be used. For example, the social network server may be a Facebook server and the user profile is provided by the user from the mobile computing device 110. The communication between the audio sever and the social network servers may enable the user to use various social network tools on the mobile computing device to post the user experience with the media on the appropriate social network site. For example, from the mobile computing device 110, the user may be able to post a "like" or "dislike" message and be able to link that message to a clip of the media that the user is experiencing. This unique feature of knowing exactly where the user is within a media or an episode enables the appropriate, context relevant clip to be shared (rather than the entire media or episode that must be manually browsed or trimmed by the recipients of the user's comments.) The user may also be able to post on the social network site a section of the media that is interesting to the user, post comments about the section of interest, share it with friends, email it to friends, link it to the actual media on the audio server 350 or the third party server 505, etc. For some embodiments, the audio server 350 may use the user profile to identify friends and automatically share the user's experience to those friends. For example, the audio server 350 may notify some or all of those friends that the user just posted a comment or casted a vote about a particular media.

The media crawler 380 is configured to enable the audio server to search the network for media that is new or not known to the audio server and that may need to be stored in the media database. A signature of the new media is added to the signature database. As mentioned above, it may be possible to store a link to a source of the media instead of storing a copy of the media in the media database.

Audio Signature Network

Figure 4:
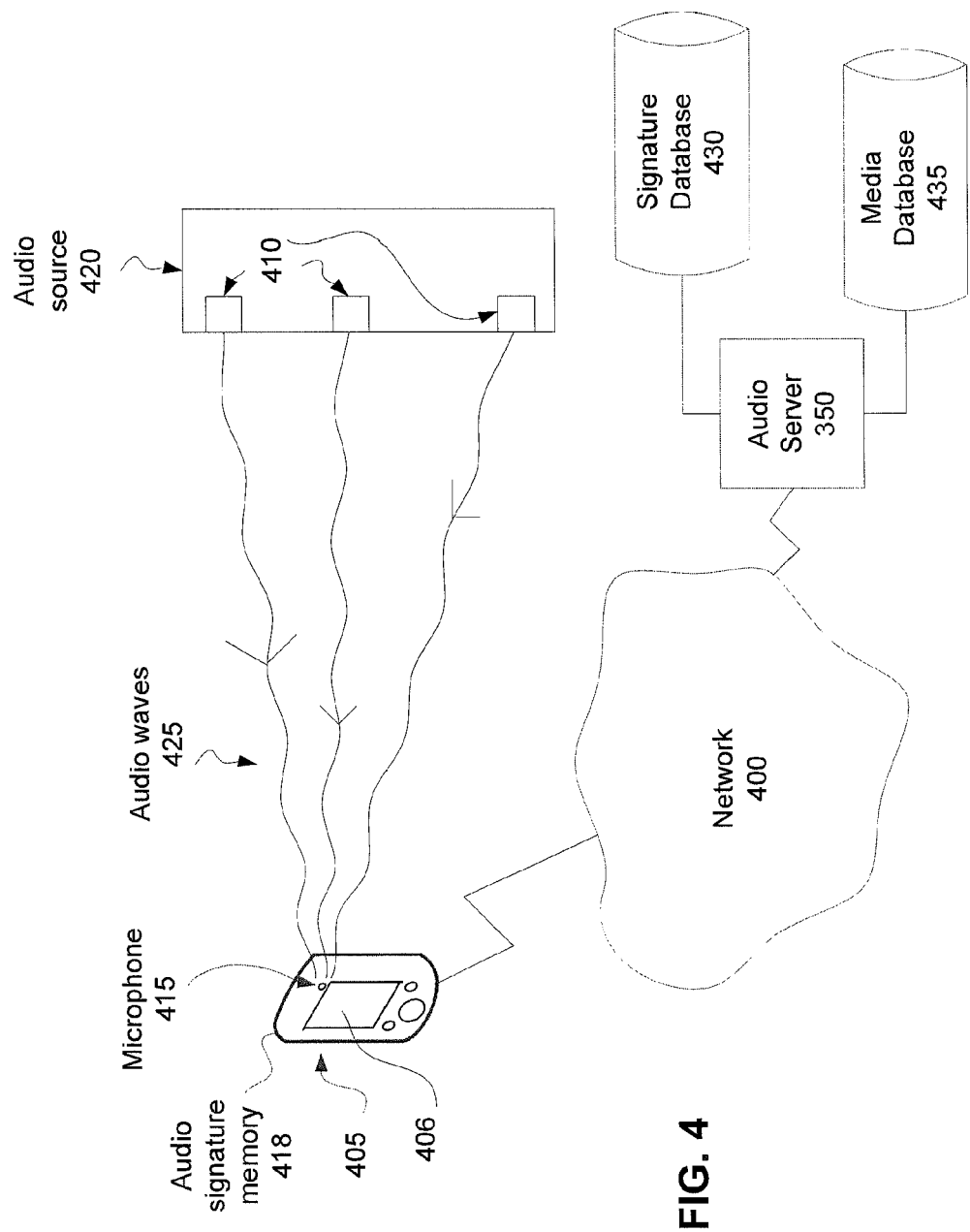
FIG. 4 illustrates an example of network of server computing devices that may be used to identify a media based on an audio signature, in accordance with some embodiments.

FIG. 4 illustrates an example of network of server computing devices that may be used to identify a media based on an audio signature, in accordance with some embodiments. The network may include an audio server 350, network 400, and mobile computing device 405. The mobile computing device 405 may be configured with a microphone 415, an audio signature memory 418, and a display screen 406. The microphone 415 is configured to capture audio waves 425 generated from the speakers 410 of an audio or audio-video source 420. The mobile computing device 405 may be connected to the network 400 via wireless communication. When the mobile computing device 405 is activated to analyze the captured audio waves 425, an audio signature may be generated. Based on the signature being compared with the known signatures stored in the signature memory 418 and recognized as a known signature, it is transmitted to the audio server 350. Audio position information may also be transmitted to the audio server 350.

The audio server 350 is coupled with the signature database 430 and the media database 435. The signature database 430 is configured to store signatures for a plurality of media. The media database 435 is configured to store a plurality of media. It may be possible that both of the signature database 430 and the media database be combined into one database. It may also be possible that there may be multiple signature databases and multiple media databases. When the audio server 350 receives a signature from the mobile computing device 405, it may search the signature database 430 to find out the information about the corresponding media. The audio server 350 may then be able to access the media from the media database 435. This enables the audio server 350 to keep track of where the user is with regard to the content of the media.

Figure 5A:
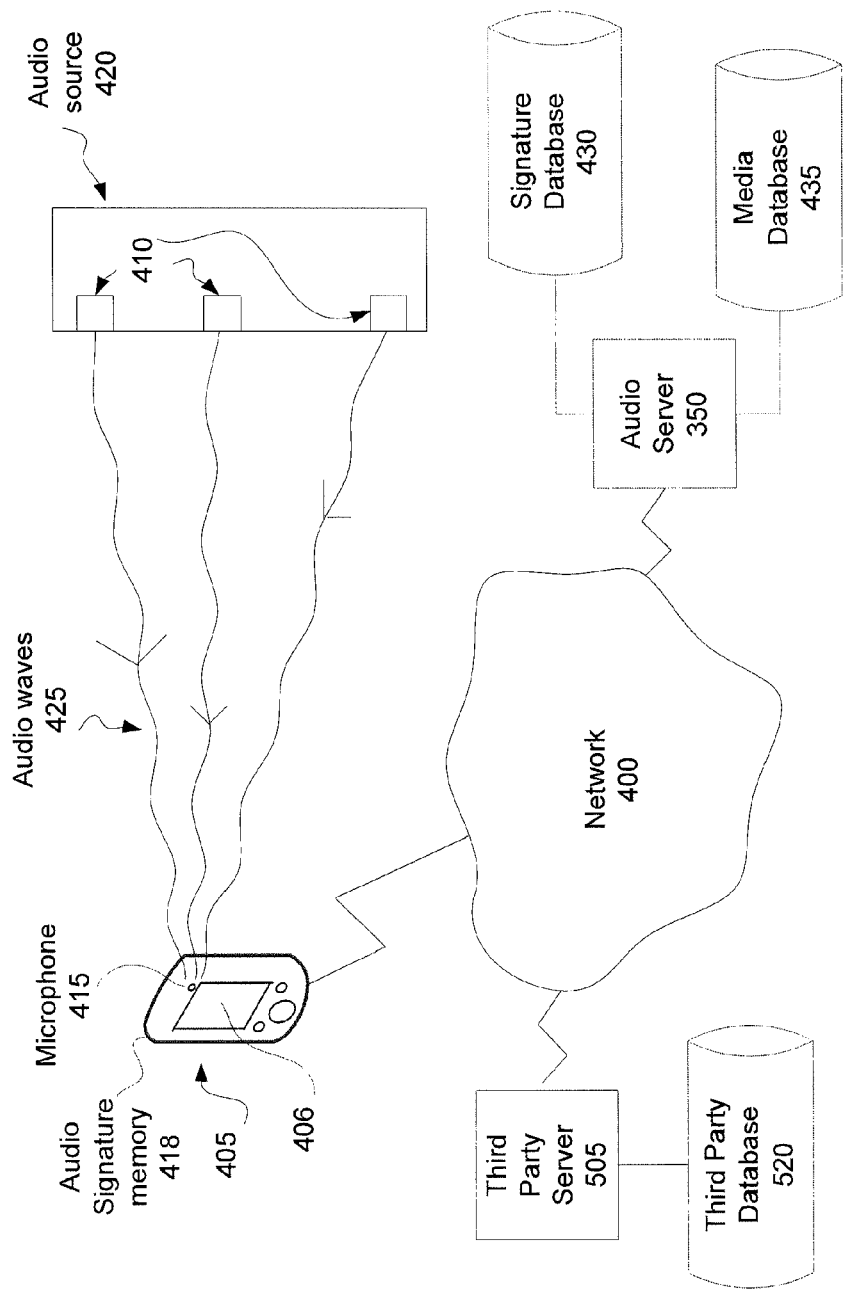
FIG. 5A illustrates a similar network diagram as FIG. 4 and with the addition of a third party server, in accordance with some embodiments.

FIG. 5A illustrates a similar network diagram as FIG. 4 and with the addition of a third party server, in accordance with some embodiments. In this example, the audio server 350 is coupled with the third party server 505 via the network 400. The third party server is associated with one or more of the media stored in the media database 435. For example, the third party server may be associated with a broadcasting program of the media. For some embodiments, the third party server 505 may have access to activities (e.g., polling) that allow viewers or listeners of the media to perform. Information about these activities may be stored in the third party database 520. The audio server 350 may receive the information about these activities from the third party server 505 and transmit the information to the user of the mobile computing device 405.

Figure 5B:
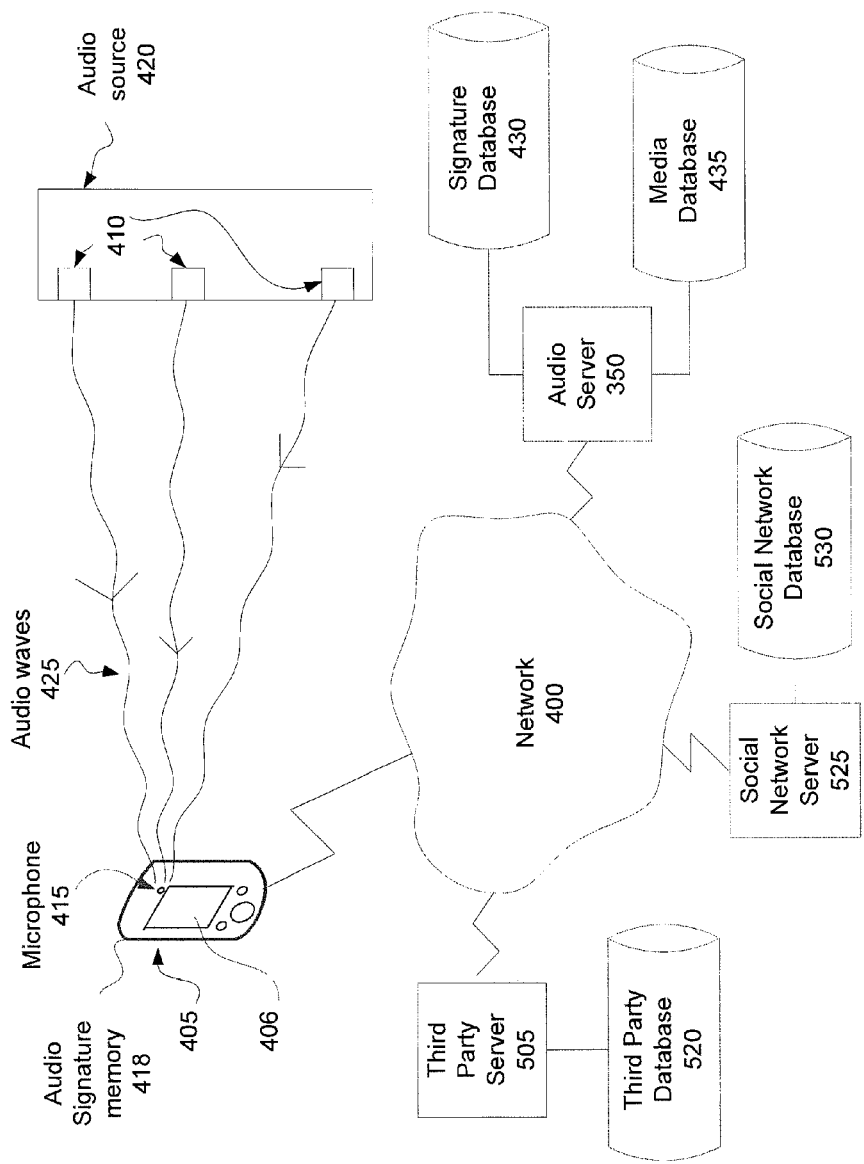
FIG. 5B illustrates a similar network diagram as FIG. 5A and with the addition of a social network server, in accordance with some embodiments.

FIG. 5B illustrates a similar network diagram as FIG. 5A and with the addition of a social network server, in accordance with some embodiments. In this example, the audio server 350 is coupled with the social network server 525 via the network 400. The social network server 525 may be associated with the social network database 530 which may be configured to store user profile information, user social network activities, friend information, etc. For some embodiments, the audio server 350 may transmit the user social network activity information as related to the media to the social network server 525 so that the activities can be posted. As mentioned, the activities may include posting a message or comment about a particular media clip, sharing a link to the media with friends, etc.

For some embodiments, the audio server 350 may be implemented as an Intelligent Data Operating Layer (IDOL) server using the IDOL application—a software product of Autonomy Corporation of San Francisco, Calif. Other software and systems associated with the IDOL application may also be used. The IDOL application collects indexed data from connectors from various sources to train the engines and stores it in its proprietary structure, optimized for fast processing and retrieval of data. As the information processing layer, the IDOL application forms a conceptual and contextual understanding of all content in an enterprise, automatically analyzing any piece of information from over thousands of different content formats and even people's interests. Hundreds of operations can be performed on digital content by the IDOL application, including hyperlinking, agents, summarization, taxonomy generation, clustering, education, profiling, alerting and retrieval.

Figure 9:
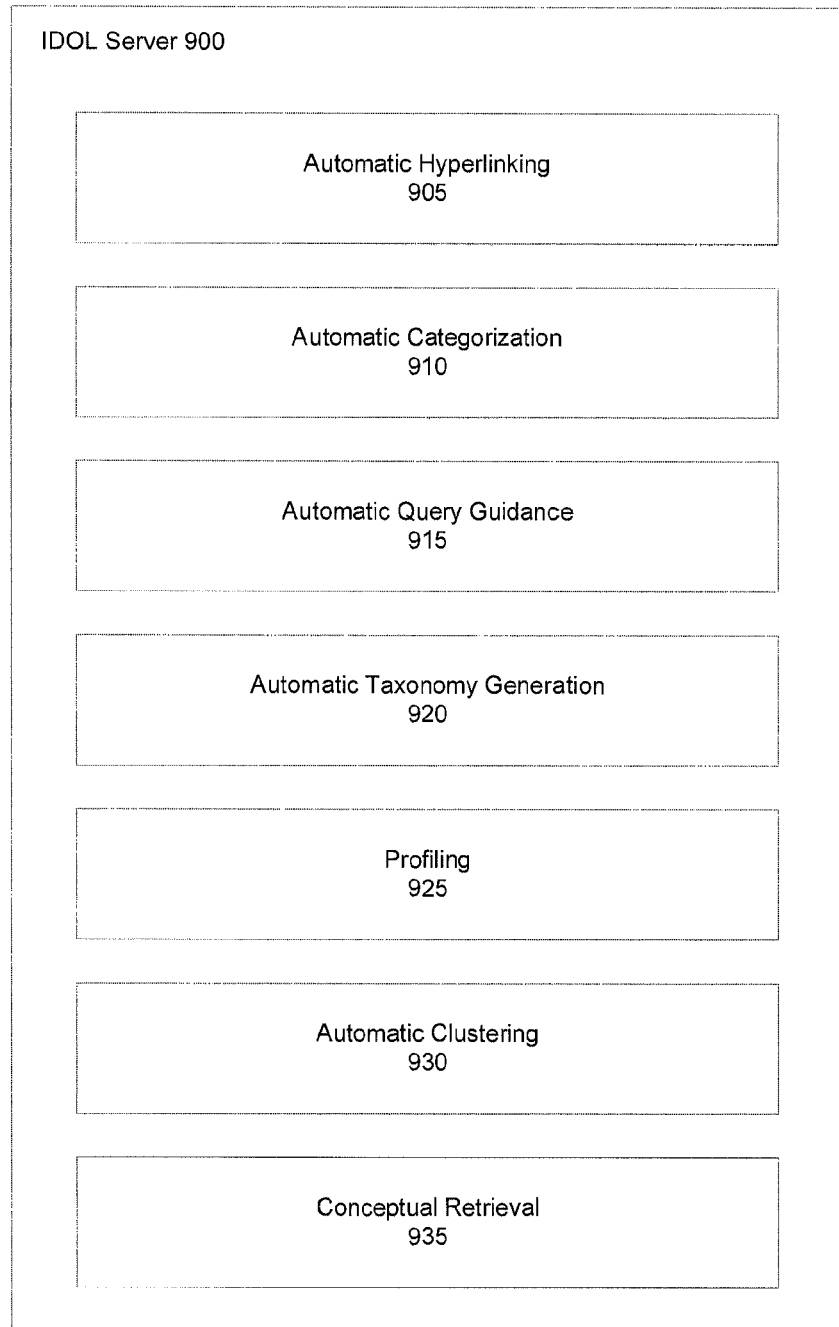
FIG. 9 illustrates an example block diagram of some modules of an IDOL server, in accordance with some embodiments.

The IDOL application has a knowledge base of concept information and is able to inter-relate the audio signature with the corresponding media. An example of the modules included in the IDOL application is illustrated in FIG. 9.

The IDOL application enables organizations to benefit from automation without losing manual control. This complementary approach allows automatic processing to be combined with a variety of human controllable overrides, offering the best of both worlds and never requiring an "either/or" choice. The IDOL application integrates with all known legacy systems, eliminating the need for organizations to cobble together multiple systems to support their disparate component.

The IDOL application may be associated with an IDOL connector which is capable of connecting to hundreds of content repositories and supporting over thousands of file formats. This provides the ability to aggregate and index any form of structured, semi-structured and unstructured data into a single index, regardless of where the file resides. The extensive set of connectors enables a single point of search for all enterprise information (including rich media), saving organizations much time and money. With access to virtually every piece of content, the IDOL application provides a 360 degree view of an organization's data assets.

The IDOL application implements a conceptual technology, is context-aware, and uses deep audio and video indexing techniques to find the most relevant products, including music, games and videos. The IDOL application categorizes content automatically to offer intuitive navigation without manual input. The IDOL application also generates links to conceptually similar content without the user having to search. The IDOL application may be trained with free-text descriptions and sample images such as a snapshot of a product. A business console presents live metrics on query patterns, popularity, and click-through, allowing the operators to configure the environment, set-up promotions and adjust relevance in response to changing demand.

Mirroring and Distributed Processing

Referring to FIG. 4, in some embodiments, there may be many audio servers 350 to accommodate the demand and usage by many users experiencing and sharing the media. For example, at a first site, there may be one or more audio servers 350. Further, there may be multiple mirrored sites, each having similar hardware and software configuration and set up as the first site. The multiple sites may collaborate with one another in a distributed manner to help speed up the analysis of the characteristics information so that the signature and the media may be identified and media position information may be kept track of in real time or near real time. This may enable the users to quickly use options or participate in activities available with the media, or to post comments and share information about the media in social network sites.

Flow Diagrams

Figure 6:
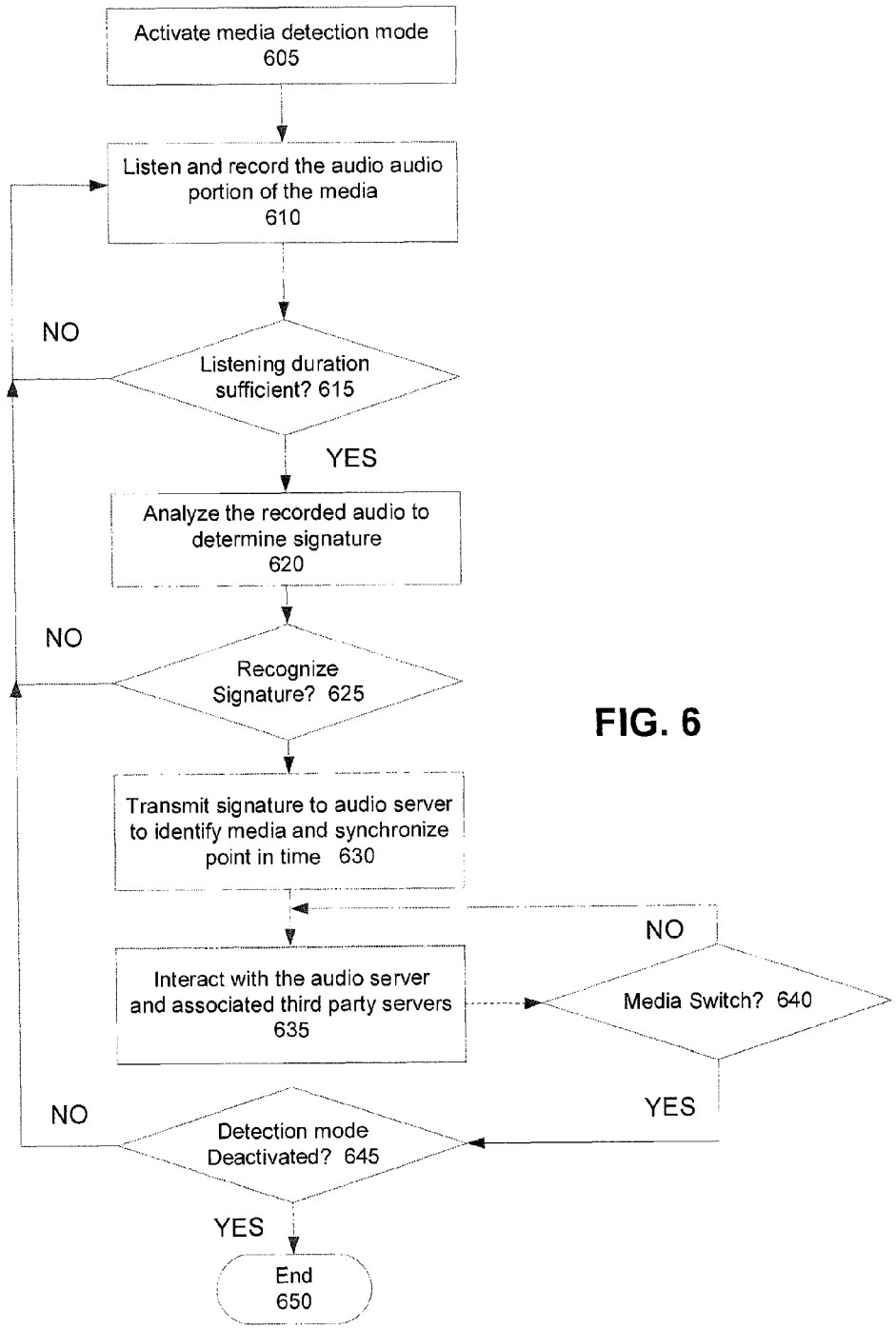
FIG. 6 illustrates an example flow diagram of a process that may be performed by a mobile computing device, in accordance with some embodiments.

FIG. 6 illustrates an example flow diagram of a process that may be performed by a mobile computing device, in accordance with some embodiments. The mobile computing device may be associated with a user, and it may include applications such as those described in FIG. 3A. At block 605, the mobile computing device is put into the detection mode. The user may use an activation option to place the mobile computing device into the detection mode. As mentioned earlier, in the detection mode a microphone of the mobile computing device may listen to and capture audio waves, as shown in block 610. The audio waves may be associated with a media that the user is experiencing or enjoying. At block 615, a test is performed to determine if the audio waves have been captured for a sufficient duration of time. Different factors may be used to determine if the duration is sufficient including, for example, fixed period of time, duration determined by the user, a time period before the activation and a time period after the activation, etc. If not sufficient, the listening and capturing operations continue at block 610. If sufficient, the process continues at block 620, where the captured audio waves are analyzed and a signature is generated. At block 625, a test is performed to determine if the signature just generated from the radio waves is similar to any of the known signatures stored in a memory of the mobile computing device. If it is not a known signature, then the media that the user is enjoying is not known to the audio server. It may be possible that the duration used to capture the audio waves is not sufficient to generate a valid signature. In this scenario, it is possible for the process to return to block 610 to continue listening and capturing the audio waves for a longer duration.

From block 625, based on the signature generated from the captured radio waves being recognized as a known signature, the process continues to block 630 where the signature is transmitted to the audio server. Position information with regard to a point in the media that the user is listening at may also be transmitted to the audio server. At block 635, the mobile computing device may receive information from the audio server about the activities or options that are available as related to the media. The mobile computing device may also receive information from the audio server about social network tools that may be available to enable the user.

For some embodiments, while the user is enjoying the media and using the activities or the social network tools, the mobile computing device may continuously monitor for a media switch. This is illustrated as a dotted arrow that connect block 635 to block 640. From block 640, if no media switch is detected, the process continues at block 635. However, when a media switch is detected, the process may flow from block 640 to block 645 where a test is performed to determine if the user has deactivated the detection mode. If there is no deactivation, the process continues at block 610 where the listening and capturing of the audio waves associated with the new media may continue. If there is a deactivation, the process may flow to block 650, where the mobile computing device may enter into the standard mode. As mentioned above, in the standard mode, the mobile computing device may continuously listen to audio waves in the environment.

Figure 7:
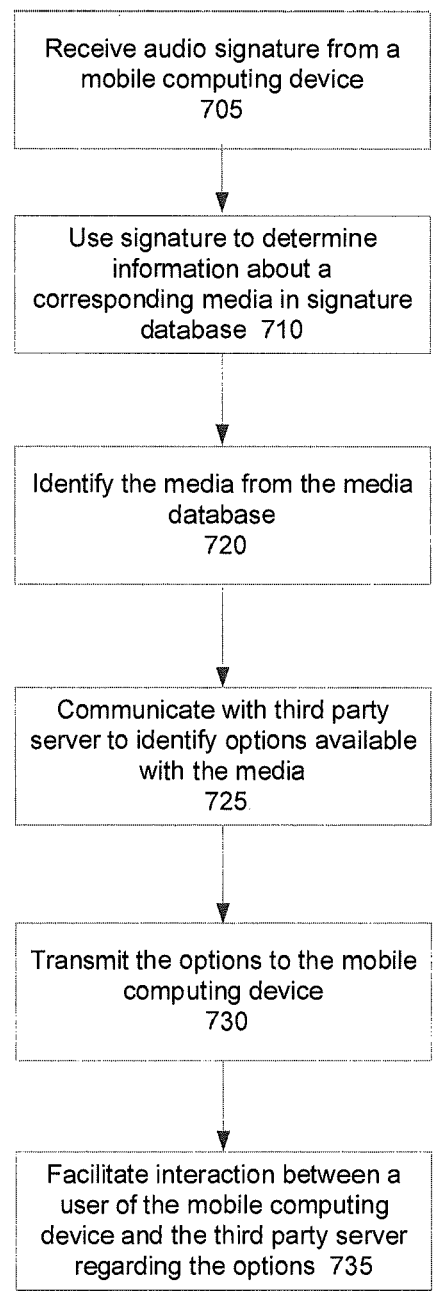
FIG. 7 illustrates an example flow diagram of a process that may be performed by an audio server coupled with a third party server, in accordance with some embodiments.

FIG. 7 illustrates an example flow diagram of a process that may be performed by an audio server coupled with a third party server, in accordance with some embodiments. The audio server may be coupled with a signature database and a media database. At block 705, the audio server receives a signature and position information from a mobile computing device. At block 710, the signature is used to determine information about a corresponding media as stored in the signature database. At block 715, the information about the media is used to identify the media as stored in the media database. As mentioned above, the media database may store a plurality of media. For some embodiments, the media database may store link information that may link to third party servers that store the media.

At block 725, the audio server may communicate with a third party server associated with the media to determine if there are activities or options available with the media. At block 730, information about the activities may be transmitted by the audio server to the mobile computing device. At block 735, the audio server may facilitate the communication between the mobile computing device and the third party server.

Figure 8:
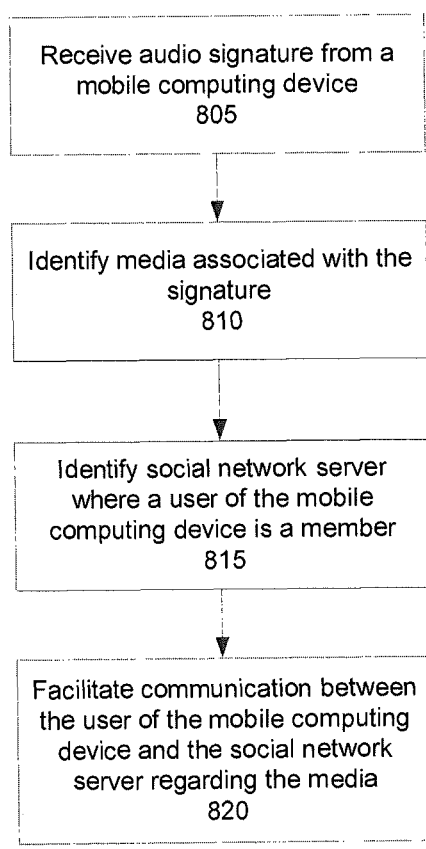
FIG. 8 illustrates an example flow diagram of a process that may be performed by an audio server coupled with a social network server, in accordance with some embodiments.

FIG. 8 illustrates an example flow diagram of a process that may be performed by an audio server coupled with a social network server, in accordance with some embodiments. The audio server may be coupled with a signature database and a media database. After the audio server receives a signature and position information from a mobile computing device in block 805 and identify the media from the media database at block 810, the audio server may communicate with a social network server that the user of the mobile computing device is associated with, as shown in block 815. The social network server is associated with a social network site. User profile information may be used to identify the user with the social network site. Various social network tools or commands such as posting comments, sharing comments with friends, etc. may be available from the social network site associated with the social network server. At block 820, the audio server may facilitate the communication between the mobile computing device and the social network server with regard to the media that the user is experiencing. Since the audio server is able to synchronize the media stored in the media server with the media that the user is experiencing by using the position information, it may be possible for the user to post a comment (e.g., like, dislike, interesting) in the social network site about a particular portion of the media. The comment may include a clip of the interesting section. The user may use the email feature of the social network site to send a clip of the interesting section to friends.

It may be noted that the above descriptions refer to the mobile computing device performing the comparing and recognizing of the signature. For some embodiments, these operations may be performed by the audio server. In that scenario, the captured audio waves or a representation of the captured audio waves may be transmitted to the audio server. It may also be noted that the ability to recognize the specific moments in the specific programs where a user is listening an audio program or watching an audio video program, content, time and context-relevant actions may be performed automatically. For example, when the user is watching a "Hawaii 50" television program, and the system recognizes that a beach scene is shown at 20 minutes and 38 seconds into the program, a Hawaii vacation advertisement may be displayed on the screen of the mobile computing device 110.

Intelligent Data Operating Layer (IDOL) Server

FIG. 9 illustrates an example block diagram of some modules of an IDOL server, in accordance with some embodiments. IDOL server 900 may include automatic hyperlinking module 905, automatic categorization module 910, automatic query guidance module 915, automatic taxonomy generation module 920, profiling module 925, automatic clustering module 930, and conceptual retrieval module 935. The automatic hyperlinking module 905 is configured to allow manual and fully automatic linking between related pieces of information. The hyperlinks are generated in real-time at the moment the document is viewed. The automatic categorization module 910 is configured to allow deriving precise categories through concepts found within unstructured text, ensuring that all data is classified in the correct context.

The automatic query guidance module 915 is configured to provide query suggestions to find most relevant information. It identifies the different meanings of a term by dynamically clustering the results into their most relevant groupings. The automatic taxonomy generation module 920 is configured to automatically generate taxonomies and instantly organizes the data into a familiar child/parent taxonomical structure. It identifies names and creates each node based on an understanding of the concepts with the data set as a whole. The profiling module 925 is configured to accurately understand individual's interests based on their browsing, content consumption and content contribution. It generates a multifaceted conceptual profile of each user based on both explicit and implicit profiles.

The automatic clustering module 930 is configured to help analyze large sets of documents and user profiles and automatically identify inherent themes or information clusters. It even cluster unstructured content exchanged in emails, telephone conversations and instant messages. The conceptual retrieval module 935 is configured to recognize patterns using a scalable technology that recognizes concepts and find information based on words that may not be located in the documents.

It should be noted that the IDOL server 900 may also include other modules and features that enable it to process the signatures received from the mobile computing devices and to identify the media associated with those signatures from the media database 435 (illustrated in FIG. 4).

Computing System

FIG. 1 illustrates a block diagram of an example computing system that may use an embodiment of one or more of the software applications discussed herein. The computing system environment 100 is only one example of a suitable computing environment, such as a client device, and is not intended to suggest any limitation as to the scope of use or functionality of the design. Neither should the computing environment 100 be interpreted as having any dependency or requirement relating to any one or combination of components illustrated in the exemplary operating environment 100.

The design is operational with numerous other general purpose or special purpose computing system environments or configurations. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The design may be described in the general context of computing device executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

The design may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary computing type system for implementing the design includes a general-purpose computing device in the form of a computing device 110. Components of computing device 110 may include, but are not limited to, a processing unit 120 having one or more processing cores, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing device 110 typically includes a variety of computing machine readable media. Computing machine readable media can be any available media that can be accessed by computing device 110 and includes both volatile and non-volatile media, removable and non-removable media. By way of example, and not limitation, computing machine readable mediums uses include storage of information, such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules, or other transport mechanism and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computing device 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor or display 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing device 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computing device 110. The logical connections depicted in FIG. 1 include a local area network (LAN) 171 and a wide area network (WAN) 173, but may also include other networks. Such networking environments are commonplace in offices, enterprise-wide computer networks, intranets and the Internet. A browser application may be resident on the computing device and stored in the memory.

When used in a LAN networking environment, the computing device 110 is connected to the LAN 171 through a network interface or adapter 170. When used in a WAN networking environment, the computing device 110 typically includes a communication module 172 or other means for establishing communications over the WAN 173, such as the Internet. The communication module 172 may be a modem used for wired, wireless communication or both. The communication module 172 may be internal or external, may be connected to the system bus 121 via the user-input interface 160, or other appropriate mechanism. In a networked environment, program modules depicted relative to the computing device 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present design can be carried out on a computing system such as that described with respect to FIG. 1. However, the present design can be carried out on a server, a computer devoted to message handling, or on a distributed system in which different portions of the present design are carried out on different parts of the distributed computing system.

Another device that may be coupled to bus 111 is a power supply such as a battery and Alternating Current adapter circuit. As discussed above, the DC power supply may be a battery, a fuel cell, or similar DC power source that needs to be recharged on a periodic basis. For wireless communication, the communication module 172 may employ a Wireless Application Protocol to establish a wireless communication channel. The communication module 172 may implement a wireless networking standard such as Institute of Electrical and Electronics Engineers (IEEE) 802.11 standard, IEEE std. 802.11-1999, published by IEEE in 1999.

While other systems may use, in an independent manner, various components that may be used in the design, a comprehensive, integrated system that addresses the multiple advertising system points of vulnerability described herein does not exist. Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Network Environment

FIG. 2 illustrates a network environment 200 in which the techniques described may be applied. The network environment 200 has a network 202 that connects server computing devices 204-1 through 204-*n*, and at least one or more client computing systems 208-1. As shown, there may be many server computing devices 204-1 through 204-*n* and many client computing systems 208-1 through 208-*n* connected to each other via a network 202, which may be, for example, the Internet. Note, that alternatively the network 202 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing device is for clarity in specifying who initiates a communication (the client computing system) and who responds (the server computing device). No hierarchy is implied unless explicitly stated. Both functions may be in a single communicating device, in which case the client-server and server-client relationship may be viewed as peer-to-peer. Thus, if two systems such as the client computing system 208-1 and the server computing device 204-1 can both initiate and respond to communications, their communication may be viewed as peer-to-peer. Likewise, communications between the client computing systems 204-1 and 204-2, and the server computing devices 208-1 and 208-2 may be viewed as peer-to-peer if each such communicating device is capable of initiation and response to communication. One or more of the server computing devices 204-1 to 204-*n* may be associated with a database such as, for example, the databases 206-1 to 206-*n*. A firewall such as, for example, the firewall 220 may be established between a client computing system 208-3 and the network 202 to protect data integrity on the client computing system 208-3.

FIG. 2 also illustrates a block diagram of an embodiment of a server computing device to display information, such as a web page, etc. The application such as, for example, a signature generation application to identify and match with possible augmented reality, when executed on the server computing device 204-1, causes the server computing device 204-1 to display windows and user interface screens on a portion of a media space, such as a web page. A user via a browser from the client computing system 208-1 may interact with the web page, and then supply input to the query/fields and/or service presented by a user interface of the application. The web page may be served by a web server computing device 204-1 on any Hypertext Markup Language (HTML) or Wireless Access Protocol (WAP) enabled client computing system 208-1 or any equivalent thereof. For example, the client mobile computing system 208-1 may be a smart phone, a touch pad, a laptop, a netbook, etc. The client computing system 208-1 may host a browser to interact with the server computing device 204-1. Each application, widget, plug-in, etc. has a code scripted to perform the functions that the software component is coded to carry out such as presenting fields and icons to take details of desired information. The applications may be hosted on the server computing device 204-1 and served to the browser of the client computing system 208-1. The applications then serve pages that allow entry of details and further pages that allow entry of more details.

Any application and other scripted code components may be stored on a computing machine readable medium which, when executed on the server causes the server to perform those functions. In an embodiment, the software used to facilitate the functions and processes described herein can be embodied onto a computing machine readable medium such as computer readable medium. As discussed above a computing machine readable medium includes any mechanism that provides (e.g., stores) information in a form readable by a machine (e.g., a computer). For example, a computing machine readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or methods stored on the computing machine readable medium may be used in the process of creating the apparatuses and/or methods described herein.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, Java, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

The present concept also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled with a computing system bus. Portions of any modules or components described herein may be implemented in lines of code in software, configured logic gates in software, or a combination of both, and the portions implemented in software are tangibly stored on a computer readable storage medium. The algorithms and displays presented herein are not inherently related to any particular computer or other apparatus. Various general purpose systems may be used with programs in accordance with the teachings herein, or it may prove convenient to construct more specialized apparatus to perform the required method blocks. The required structure for a variety of these systems will appear from the description herein.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, specific examples are provided for shapes and materials; however, embodiments include those variations obvious to a person skilled in the art, such as changing a shape or combining materials together. Further, while some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The invention is to be understood as not limited by the specific embodiments described herein, but only by scope of the appended claims.

What is claimed is:

1. A computer-implemented method for enabling a user of a mobile computing device to use audio signatures, the method comprising:
    capturing a portion of audio waves within a media using a built-in microphone of a mobile computing device;
    generating, by a processor, a signature from the audio waves captured by the microphone;
    determining whether the generated signature matches a signature in a set of known signatures stored in a memory of the mobile computing device;
    determining a positioning information of the captured portion of audio waves, wherein the positioning information identifies a position within the media at which the portion of audio waves is captured;
    in response to a determination that the generated signature matches a signature in the set of known signatures, transmitting, by the processor, the signature and the positioning information to an audio server;
    receiving, by the processor, activity information associated with a third party server including at least one of a comment post on an online social network, a text message via SMS, and an email from the audio server, the activity information related to the identified point in time within the media at which the audio waves are captured by the microphone media; and
    enabling, by the processor, use of the activity information to interact with the third party server.

2. The method of claim 1, wherein the third party server is associated with the media, and wherein the activity information enables the user of the mobile computing device to interact with the third party server about the media.

3. The method of claim 1, wherein the third party server is a social network server associated with the user based on a user profile of the user, and wherein the activity information comprises social network tools that enable the user to interact with the social network server about the media.

4. The method of claim 3, wherein the social network tools enable the user to post comments about the media and to share one or more clips of the media with friends who are members of a social network associated with the social network server, wherein the one or more clips of the media include specific moments mentioned in the comments about the media.

5. The method of claim 1, further comprising:
    displaying the activity information and the positioning information on a display screen of the mobile computing device.

6. The method of claim 5, wherein the audio server is coupled with a signature database to store a plurality of known signatures, each of the known signatures associated with a media, and wherein the method further comprises periodically updating the set of known signatures stored in the memory of the mobile computing device using the plurality of known signatures stored in the signature database.

7. The method of claim 1, further comprising enabling the mobile computing device to enter a detection mode to capture the audio waves used to generate the signature.

8. The method of claim 1, further comprising:
    monitoring a media switch from the media to a different media and in response to the media switch, at least one of:
        capturing audio waves associated with the different media using the microphone of the mobile computing device; and
        disabling the generation of the signature and the determination of matches for the signature.

9. A system to enable use of audio signatures to improve social experience, the system comprising:
    an audio server to receive a signature, wherein the signature is generated from a portion of audio waves captured within a media, from a mobile computing device, and receive positioning information of the captured portion of the audio waves, wherein the positioning information identifies a position within the media at which the portion of audio waves is captured;
    a signature database coupled with the audio server to store a plurality of signatures and corresponding information about a plurality of media; and
    a media database to store a plurality of media,
    wherein the audio server is to use the received signature and the signature database to identify the media in the media database, communicate with a social network server to enable a user of the mobile computing device to use social network tools associated with the social network server to share the positioning information, and use the position within the media to identify activity information related to the position within the media and to communicate the activity information to the mobile computing device.

10. The system of claim 9, wherein the audio server is to use a user profile of the user of the mobile computing device to enable the user to use the social network tools.

11. The system of claim 9, wherein the audio server is to enable the user to share a clip of the media using the social network tools, and wherein the clip is determined based on the position information.

12. The system of claim 9, wherein the audio server is to enable the user to post a comment about a section of the media using the social network tools, and wherein the section of the media is identified using the position information.

13. The system of claim 9, wherein the audio server is to communicate with a third party server associated with the media to identify information about activities that are available with the media and to transmit the information about the activities to the mobile computing device.

14. The system of claim 13, wherein the audio server is to facilitate interactions between the mobile computing device and the third party server as related to the information about the activities available with the media.

15. The system of claim 9, wherein the plurality of signatures stored in the database are periodically transmitted to the mobile computing device to enable the mobile computing device to perform signature recognition.

16. A non-transitory computer-readable medium that stores machine-readable instructions, which when executed by a processor, cause the processor to:
    capture audio waves associated with an audio portion of a media using a built-in microphone of a mobile computing device;
    generate a signature using the audio waves when it is determined that a sufficient duration of the audio waves has been captured;
    determine whether the generated signature matches a signature in a set of known signatures stored in a memory of the mobile computing device;
    determine a positioning information of the captured audio waves, wherein the positioning information identifies a position within the media at which the audio waves is captured;
    transmit the generated signature and the positioning information to an audio server in response to a determination that the generated signature matches a stored signature in the memory of the mobile computing device;

receive options available with the known media from the audio server based on the audio server communicating with a third party server associated with the known media, wherein the user of the mobile computing device is to use the options to interact with the media; and transmit social network commands to the audio server to post comments from the user about the known media in a social network site, wherein the audio server is to communicate with a social network server associated with the social network site, wherein the user is a member of the social network site, and wherein the comments posted by the user includes information related to the positioning information.

17. The non-transitory computer-readable medium of claim 16, wherein the machine-readable instructions are further to cause the processor to enable the user of the mobile computing device to confirm that a sufficient amount of audio waves has been captured before the signature is generated.

18. The non-transitory computer-readable medium of claim 17, wherein the machine-readable instructions are further to cause the processor to enable the user of the mobile computing device to activate the capturing of the audio waves to generate the signature from.

19. The non-transitory computer-readable medium of claim 18, wherein the machine readable instructions are further to cause the processor to monitor for a media switch from the media to another media, and in response to the media switch, the mobile computing device is to at least one of:

capture audio waves associated with the another media using the built-in microphone of the mobile computing device; and disable the generation of the signature and the determination of matches for the signature.

* * * * *